James F. Paterson
INVENTOR.
BY
ATTORNEYS.

Patented July 16, 1940

2,208,103

UNITED STATES PATENT OFFICE 2,208,103

GLASSES

James F. Paterson, St. Paul, Minn.; Katherine K. Paterson, executrix of James F. Paterson, deceased Application August 21, 1937, Serial No. 160,297

3 Claims. (Cl. 88—47)

My invention relates to an improvement in glasses wherein it is desired to provide a means of mounting the lenses of the glasses in a simple and effective manner. Glasses are commonly provided with a frame which either extends entirely about the lenses, or which extends partially about the lenses and is secured thereto by small bolts which extend through the frame of the glasses and through the lenses. This type of mounting is objectionable for various reasons. It is often undesirable to provide a frame extending entirely about the glasses because this frame definitely limits the shape of the lenses and because the frame is at all times noticeable. In constructions where the frame extends along only a portion of the lens, it is necessary to provide ears extending substantially over the surfaces of the lenses in order that the bolts through the lenses may be positioned at a point sufficiently spaced from the lens edge.

Because of the modern trend of making the frames as inconspicuous as possible, attempts have been made to support the lenses in various ways to conceal as much of the frame as possible. I have accomplished that result by concealing the major portion of the frames behind the lenses so that only a small portion of the frames may be observed.

It is a feature of my invention to provide a construction wherein the lenses are supported by the frame under spring tension of the frame, so that they may be easily and quickly removed or replaced at a minimum of cost. The frames are so constructed as to extend behind the edges of the lenses so that the frames may be sprung to some extent when necessary to disengage the lenses from the frame.

It is a feature of my invention to extend the major portion of the frame immediately behind the edge of each lens. While the lenses are, of course, transparent, the refraction of light by the lenses acts to conceal the frames to a considerable degree, making a large portion of the frames virtually unnoticeable.

It is an added feature of my invention to provide a construction wherein a minimum portion of the frame overlies the outer surface of each lens. This portion of the frame overlying the lens is positioned near the top of the lens so that the frames will be virtually out of the line of vision of the wearer and accordingly will not interfere with the vision through the lenses.

The lenses are entirely supported by the frame adjacent the top of the same by providing a spring grip which secures the lenses to the frame under spring tension.

These and other features and novel objects of my invention will be more fully and clear set forth in the following specification and claims.

In the drawing forming a part of my specification:

Figure 1:
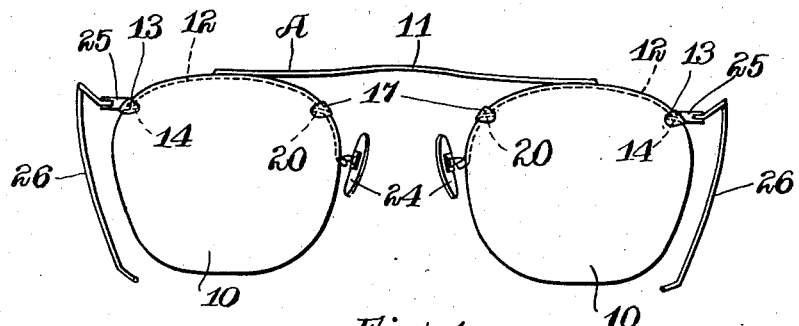
Figure 1 is a front elevation view of a pair of glasses embodying my invention.
Figure 2:
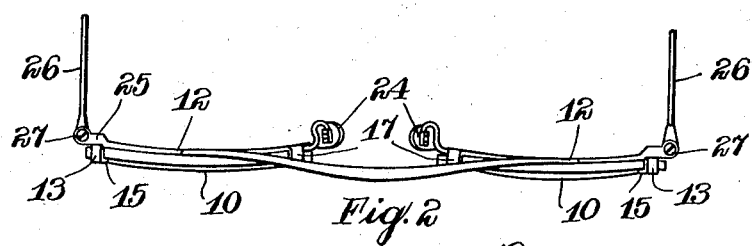
Figure 2 is a top plan view of the glasses illustrated in Figure 1.
Figure 3:
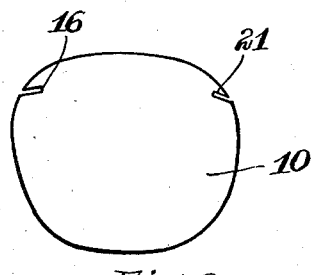
Figure 3 is a view of a lens prepared for use in combination with the frames of my construction.
Figure 4:
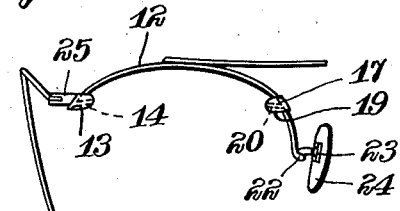
Figure 4 illustrates a portion of a frame suitable for supporting the lens illustrated in Figure 3.

The glasses A are provided with a frame portion and spaced lenses 10. The frame comprises a bridge 11 connecting a pair of arcuated lens engaging portions 12. The lens engaging portions 12 extend rearwardly of the lenses 10 so that one edge of these portions 12 preferably bear against the inner surface of the lenses 10. At one end of each lens engaging portion 12, I provide a lip 13 which extends over the outer edge of the lens 10 and is bent at substantially right angles to overlie the front or outer surface of the lens 10. A flange 14 connects the portion 15 of the lip 13 overlying the outer surface of the lens 10 and the lens engaging portion 12. This flange 14 is adapted to engage in a notch 16 formed in the edge of the lens 10.

On the opposite side of the lens from the lip 13, I provide a second lip 17, having a portion 19 overlying the front or outer surface of the lens 10. This portion 19 is connected to the lens engaging portion 12 of the frame by means of a flange 20. The flange 20 is adapted to engage in a notch 21 in the edge of the lens 10. As may be seen in the drawing, the notches 16 and 21 are angularly disposed so that when the flanges 14 or 20 are engaged therein, the lens cannot be accidentally disengaged from the frame portion 12. A dove-tail connection is in this way provided between the frame portions 12 and the lens 10. By flexing the lens engaging portions 12 in a manner to reduce the arcuation of this portion, the flanges 14 and 20 may be separated and thus by flexing the portions 12 the frame may be disengaged from the lenses 10.

Figure 5:
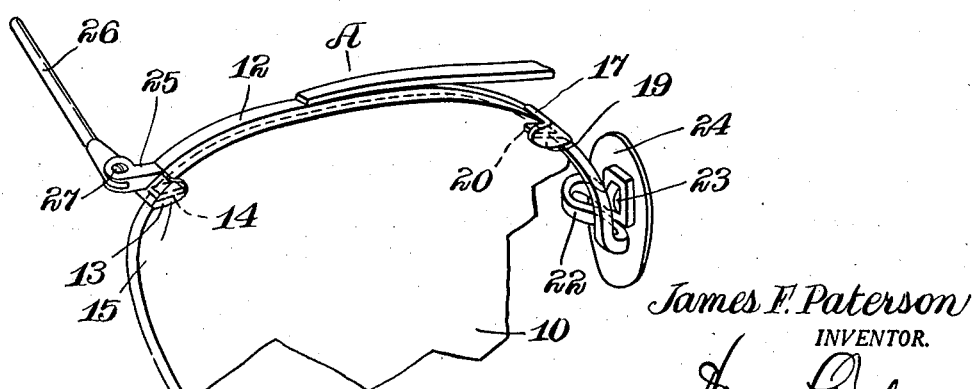
Figure 5 is an enlarged perspective view of a portion of a lens and frame therefor, illustrating the construction of the supporting means.

The lens engaging portion 12 preferably extends beyond the lip 17 and is provided at the extremity thereof with an arm 22 which is pivotally connected at 23 with a nose rest 24 of suitable design. This conection may perhaps be best seen in Figure 5 of the drawing.

Adjacent the lips 13 I provide brackets 25 secured adjacent the ends of the lens engaging portions 12 to which bows 26 may be pivotally connected by bolts 27 or other suitable means.

It is understood that frames have previously been constructed, providing a dove-tail connection between the frame and the lenses 10. These former types of frames, however, have extended along the edge of each lens 10 and therefore, could not be bowed inwardly so that the flanges 14 and 20 could be removed from the notches 16 and 21. By extending the lens engaging portions 12 along the face or surface of the lens 10, it is possible to spring the frame into or out of engagement with the lens. It will be noted that the positioning of the frame along the surface of the lens, rather than overlying the edge of the same, permits the frame to be sprung inwardly so as to decrease the curvature of this portion of the frame and to release the flanges 14 and 20 from the notches 16 and 21. My lenses are accordingly supported in a secure and rigid manner but may be readily disengaged from the frame in a minimum of time.

The lenses 10 are positioned between the portions 15 and 19 of the lips 13 and 17 and the lens engaging portion 12 of the frame. In this way, the lens is maintained in desired relationship to the frame and cannot twist or turn within the frame.

In accordance with the patent statutes I have described the principles of construction and operation of my glasses, and while I have endeavored to set forth the best embodiment thereof, I desire to have it understood that this is only illustrative of a means of carrying out my invention, and that obvious changes may be made within the scope of the following claims without departing from the spirit of my invention.

I claim:

1. Glasses comprising a pair of spaced lenses, a frame of resilient material overlying a surface of each lens adjacent an edge thereof and curved to normally coincide with the shape of the lens edge, each said frame being free to flex inwardly toward the center of its respective lens intermediate the ends thereof to space the frame ends farther apart, a pair of notches in each lens extending inwardly from the edge thereof, the bases of said notches in each lens being closer together than the mouths of the same at the lens edge, means on each end of each frame member engageable in said notches and engageable with the surface of the adjacent lens opposite that surface overlied by said frame, said means disengageable from said notches by flexing said frame inwardly intermediate its ends to spread the ends thereof apart, and a bridge connecting said frames.

2. Glasses comprising a pair of spaced lenses, a frame member overlying one surface of each lens adjacent an edge thereof, said frame member following the contour of the adjacent lens, a lip secured at each end of each frame member overlying a portion of the edge of the frame and a portion of the other surface of the lens, notches in said lens, means between said lip and said frame member engaged in said notches, a bow support at one end of said frame member, a nose rest secured to the other end of said frame member, and a bridge connecting said frame members.

3. Glasses comprising a pair of spaced lenses, a frame member overlying one surface of each lens following the contour of a portion of the lens and positioned adjacent this lens edge, a lip at each end of each said frame member overlying a portion of the lens edge and a portion of the opposite surface of said lens, notches in each said lens concealed by each said lip and intermediate each said lip and said frame members, a tongue between each said lip and its respective frame member engageable in each said notch, a bow support secured to one end of each said frame members, a nose support secured to the other end of each of said frame members, and a bridge member secured to the upper surface of each of said frame members to connect the same.

JAMES F. PATERSON.